(12) United States Patent
Yoshimura et al.

(10) Patent No.: US 12,334,278 B2
(45) Date of Patent: Jun. 17, 2025

(54) CATHODE FOIL COMPRISING POROUS METAL AND COATING FILM COVERING THE POROUS METAL AND ELECTROLYTIC CAPACITOR INCLUDING THE SAME

(71) Applicant: Panasonic Intellectual Property Management Co., Ltd., Osaka (JP)

(72) Inventors: Mitsuhisa Yoshimura, Osaka (JP); Miwa Ogawa, Osaka (JP); Natsuyo Sasada, Nara (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 21 days.

(21) Appl. No.: 17/661,709

(22) Filed: May 2, 2022

(65) Prior Publication Data

US 2022/0262577 A1 Aug. 18, 2022

Related U.S. Application Data

(63) Continuation of application No. PCT/JP2020/044131, filed on Nov. 27, 2020.

(30) Foreign Application Priority Data

Nov. 29, 2019 (JP) ................................. 2019-216080

(51) Int. Cl.
*H01G 9/042* (2006.01)
*H01G 9/00* (2006.01)
(Continued)

(52) U.S. Cl.
CPC ......... *H01G 9/0425* (2013.01); *H01G 9/0029* (2013.01); *H01G 9/048* (2013.01); *H01G 9/15* (2013.01)

(58) Field of Classification Search
CPC ...... H01G 9/0029; H01G 9/15; H01G 9/0032; H01G 9/151; H01G 9/055
See application file for complete search history.

(56) References Cited

U.S. PATENT DOCUMENTS 4,763,229 A * 8/1988 Ohtuka .................. H01G 9/045
29/25.03
6,504,704 B1 * 1/2003 Hatanaka ................. H01G 9/04
29/25.03
(Continued)

FOREIGN PATENT DOCUMENTS

EP 0905274 A1 * 3/1999
JP 2001085277 A * 3/2001 ............... H01G 9/00
(Continued)

OTHER PUBLICATIONS

International Search Report of PCT application No. PCT/JP2020/044131 dated Feb. 16, 2021.

*Primary Examiner* — Nathan Milakovich
*Assistant Examiner* — Daniel M Dubuisson
(74) *Attorney, Agent, or Firm* — Rimon P.C.

(57) ABSTRACT

A cathode foil for electrolytic capacitors includes a metal porous part, a metal core part that is continuous with the metal porous part, and a coating film covering the metal porous part. Pores in the metal porous part are open at a first main surface of the cathode foil. The coating film is disposed in a region from the first main surface to a depth more than or equal to 10% of a thickness of the metal porous part in a thickness direction of the metal porous part.

16 Claims, 5 Drawing Sheets

(51) Int. Cl.
  *H01G 9/048* (2006.01)
  *H01G 9/15* (2006.01)

(56) References Cited

U.S. PATENT DOCUMENTS

| | | | |
|---|---|---|---|
| 2011/0020603 A1* | 1/2011 | Kunishi | H01G 9/055 |
| | | | 427/79 |
| 2013/0050904 A1* | 2/2013 | Nemoto | H01G 9/04 |
| | | | 361/528 |
| 2013/0330617 A1 | 12/2013 | Yoshimura et al. | |
| 2013/0342966 A1* | 12/2013 | Horio | H01G 9/07 |
| | | | 29/25.03 |
| 2014/0036416 A1* | 2/2014 | Ishimoto | H01G 9/045 |
| | | | 427/80 |
| 2014/0334070 A1* | 11/2014 | Kobayashi | H01G 9/042 |
| | | | 29/25.03 |
| 2016/0093413 A1* | 3/2016 | Uzawa | C08K 5/17 |
| | | | 252/500 |
| 2016/0163465 A1* | 6/2016 | Morioka | H01G 9/07 |
| | | | 29/25.03 |
| 2016/0322171 A1* | 11/2016 | Saeki | H01G 9/0029 |
| 2018/0174751 A1* | 6/2018 | Saeki | H01G 4/12 |
| 2018/0358181 A1 | 12/2018 | Ogawa et al. | |
| 2019/0304704 A1 | 10/2019 | Ishimaru et al. | |
| 2020/0243865 A1* | 7/2020 | Sawada | H01G 11/68 |
| 2021/0193395 A1* | 6/2021 | Koseki | H01G 9/042 |

FOREIGN PATENT DOCUMENTS

| | | | | |
|---|---|---|---|---|
| JP | 2012-174865 | 9/2012 | | |
| JP | 2013-164939 | 8/2013 | | |
| JP | 6326633 B2 * | 5/2018 | ........... | H01G 9/0036 |
| JP | 2019-179884 | 10/2019 | | |
| WO | 2017/154461 | 9/2017 | | |

\* cited by examiner

FIG. 6

CATHODE FOIL COMPRISING POROUS METAL AND COATING FILM COVERING THE POROUS METAL AND ELECTROLYTIC CAPACITOR INCLUDING THE SAME

BACKGROUND

1. Technical Field

The present disclosure relates to a cathode foil for electrolytic capacitors, an electrolytic capacitor, and methods respectively for producing those.

2. Description of the Related Art

A metal foil containing a valve metal is used for an anode body of an electrolytic capacitor. From the viewpoint of increasing electrostatic capacitance, at least a part of a main surface of a metal material is subjected to a treatment such as etching to form a porous body. Subsequently, the porous body is subjected to an anodizing treatment to form a metal oxide (dielectric) layer on a surface having pores or irregularities.

Meanwhile, as a configuration of a cathode body, a roughened metal foil, an anodized foil obtained by further anodizing the roughened metal foil, or a metal foil on which a surface layer of a non-valve metal, such as titanium, is formed is used according to the application.

Japanese Unexamined Patent Publication No. 2012-174865 describes a cathode foil for solid electrolytic capacitors including a first conductive layer, a mixture layer in which a substance constituting the first conductive layer and carbon are mixed, and a second conductive layer substantially made of carbon formed on an electrode substrate which is not roughened. Here, a component concentration of the mixture layer changes from a component configuration substantially containing only the substance constituting the first conductive layer to a component configuration substantially containing only carbon as proceeding from the first conductive layer to the second conductive layer. By this configuration, a high capacitance is obtained, and characteristics of the electrolytic capacitor such as a low equivalent series resistance (ESR) can be improved.

SUMMARY

A cathode foil for electrolytic capacitors according to an aspect of the present disclosure includes a metal porous part, a metal core part that is continuous with the metal porous part, and a coating film covering the metal porous part. Pores in the metal porous part are open at a first main surface of the cathode foil for electrolytic capacitors. The coating film is formed in a region from the first main surface to a depth more than or equal to 10% of a thickness of the metal porous part in a thickness direction of the metal porous part.

An electrolytic capacitor according to another aspect of the present disclosure includes the cathode foil, an anode body including a dielectric layer disposed on a surface of the anode body, and an electrolyte.

A method for producing a cathode foil for electrolytic capacitors according to still another aspect of the present disclosure includes: a step of preparing a metal substrate having a metal porous part and a metal core part that is continuous with the metal porous part; and a step of forming a coating film on a surface of a metal portion forming the metal porous part of the metal substrate. The coating film is formed by an atomic layer deposition (ALD) method.

A method for producing an electrolytic capacitor according to yet another aspect of the present disclosure includes: a step of obtaining a cathode foil using the method for producing a cathode foil; a step of preparing an anode body including a dielectric layer disposed on a surface of the anode body; and a step of forming a capacitor element using the anode body and the cathode foil.

Characteristics of the electrolytic capacitor can be improved by using the cathode foil of the present disclosure.

DETAILED DESCRIPTIONS OF EMBODIMENT

[Cathode Foil for Electrolytic Capacitors]

A cathode foil for electrolytic capacitors according to an exemplary embodiment of the present disclosure includes: a metal porous part, a metal core part that is continuous with the metal porous part, a first main surface at which pores of the metal porous part are open; and a coating film covering the metal porous part. More specifically, the coating film covers a surface of a metal framework constituting the metal porous part. The coating film may include a conductive first layer containing a first element and/or a second layer that is an oxide film containing a second element. The coating film may include both the first layer and the second layer. In such a case, the first layer covers at least a part of the second layer.

In the present exemplary embodiment, at least one of main surfaces (first main surface) of the cathode foil is roughened, and pores are formed so as to open at the first main surface of the cathode foil. A region at a side close to the first main surface in the cathode foil, in which the pores are formed, is the metal porous part. And an inside region of the cathode foil, in which no pore is formed, is the metal core part.

Note that the main surfaces of the cathode foil (cathode body) or an anode foil (anode body) are two surfaces occupying the largest area in a macroscopic view (under visual observation) among surfaces of these electrode foils. End surfaces of the cathode foil or the anode foil are surfaces that are other than the main surfaces and exist at ends of the electrode foil, and also include a cutting surface when a large electrode foil is cut. In a wound body, end surfaces are surfaces of the electrode foil that are provided as a top surface and a bottom surface other than a peripheral surface.

In general, a natural oxide film is formed on the surface of the cathode foil. The natural oxide film has an action of protecting a metal portion of the cathode foil from an electrolyte. However, since a thickness of the natural oxide film is not sufficient to protect the metal portion from the electrolyte in some cases, a reaction between the metal portion and the electrolyte may easily proceed when a voltage is applied. Further, the reaction between the metal portion and the electrolyte easily proceeds through a thin portion of the natural oxide film. As a result, there may be a case where degradation due to generation of a gas and oxidation of the cathode foil increases. In addition, since there is a case where it is difficult to obtain sufficient water resistance by the natural oxide film, the degradation of the foil may easily proceed due to a hydration reaction when the electrolyte contains moisture. As a result, ESR may easily increase.

It is also conceivable to form a thick oxide film by performing an anodizing treatment on the cathode foil in order to suppress the degradation of the cathode foil. In this case, a capacitance can also be generated on the cathode side. When the capacitance is generated not only on the anode but also on the cathode side, a capacitance (combined capacitance) of the entire electrolytic capacitor decreases. However, it is possible to suppress a decrease in the capacitance of the entire electrolytic capacitor by forming the oxide film (corresponding to the second layer to be described later) having an appropriate thickness on the roughened cathode foil to intentionally increase the capacitance on the cathode side.

Since the roughened cathode foil is used, a contact area between the electrolyte and the cathode foil increases, and ESR is easily lowered. Further, the capacitance on the cathode side can be enhanced. Meanwhile, when a surface area of the cathode foil increases, the reaction with the electrolyte easily occurs on the surface of the cathode foil, and the cathode foil is easily degraded.

In one aspect of the electrode foil for electrolytic capacitors according to the present exemplary embodiment, the surface of the cathode foil may be coated with the conductive first layer. This makes it possible to suppress the generation of the capacitance on the cathode side. When the conductive first layer is electrically connected to the metal core part, the cathode foil substantially functions as a conductor, and a decrease in capacitance of the electrolytic capacitor can be suppressed. In an electrolytic capacitor using a solid electrolyte such as a conductive polymer, the conductive polymer is formed so as to fill pores deep inside the metal porous part. In this case, when inner walls of the pores are covered with the first layer, adhesion between the solid electrolyte and the cathode foil is improved, and ESR can be reduced. The first layer contains the first element. The first element may be at least one element selected from the group consisting of carbon, nickel, silver, and gold.

In one mode of the electrode foil for electrolytic capacitors according to the present exemplary embodiment, the surface of the cathode foil may be coated with the second layer that is the oxide film. The capacitance generated on the cathode side can be appropriately enhanced to suppress the decrease in the capacitance of the entire electrolytic capacitor. Since the reaction between the metal portion and the electrolyte is suppressed by the second layer, the degradation of the cathode foil is suppressed, and ESR can be maintained low. Further, an electrolytic capacitor excellent in withstand voltage is obtained. The second layer contains the second element. The second element may be at least one element selected from the group consisting of aluminum, titanium, silicon, tantalum, niobium, hafnium, and zirconium.

A thickness of the second layer is set to a desired thickness according to characteristics of the electrolytic capacitor. From the viewpoint of maintaining the capacitance, the thickness of the second layer may be less than or equal to a thickness of an oxide film obtained by anodizing a metal containing the second element at 4 V. For example, when the second element is aluminum, the thickness of the second layer may be less than or equal to 5 nm. On the other hand, from the viewpoint of increasing the withstand voltage, the thickness of the second layer may be thicker than the thickness of the oxide film obtained by anodizing the metal containing the second element at 4 V. Note that the above description does not necessarily mean that the second layer is formed by an anodizing treatment, and includes, for example, a case where the second layer is formed by deposition to have a thickness that may be obtained if the anodizing is performed at 4 V.

Note that thicknesses obtained by the anodizing of the metal containing the second element at 4 V are given as follows when the second element is aluminum, titanium, silicon, tantalum, niobium, hafnium, or zirconium, respectively. In the following description, in the case of silicon, the thickness corresponds to a thickness of a silicon oxide film that can bring a withstand voltage equivalent to an withstand voltage of an aluminum oxide film formed by the anodizing at 4 V.

Aluminum: 5 nm
Titanium: 12 nm
Silicon: 2 nm
Tantalum: 6 nm
Niobium: 9 nm
Hafnium: 11 nm
Zirconium: 8 nm The coating film including the first layer and/or the second layer may be formed in a region from a first main surface of the metal porous part to a depth more than or equal to 10%, more than or equal to 20%, more than or equal to 30%, or more than or equal to 50% of a thickness of the metal porous part in a thickness direction of the metal porous part.

The first layer and/or the second layer can be formed by an atomic layer deposition (ALD) method. According to the ALD method, a source gas (precursor material) can diffuse in voids constituted by the pores of the metal porous part and penetrate deep inside the pores that each have a winding shape. As a result, the first layer and/or the second layer can also adhere to the inner walls of the pores which are not exposed from the first main surface where the pores of the metal porous part are open and are shaded by the metal framework of the metal porous part. Thus, by using the ALD method, the first layer and/or the second layer can be formed in a region extending from the first main surface to a deep portion of the metal porous part. In the ALD method, although the source gas (precursor material) can reach the deep portion of the metal porous part away from the outer surface (first main surface) through the pores, it becomes more difficult for the precursor material to reach a portion that is farther from the first main surface. As a result, a thickness of the coating film has a distribution in which the thickness is thicker at a side closer to the first main surface (more precisely, as the diffusion distance of the source gas supplied from the first main surface through the pores is shorter) and is thinner as being away from the first main surface (at a side closer to the metal core part).

The second layer may be formed by an anodizing treatment. When the second layer is formed by the anodizing treatment, a state of the anodization is not stabilized by applying an anodizing voltage less than or equal to 4 V, and it is difficult to form a thin anodization coating film with a uniform film thickness and few defects and densely. In some cases, a portion where the second layer is not formed or the thickness of the second layer is thin is generated on a part of the surface of the metal framework of the metal porous part. As a result, the cathode foil is easily degraded by the reaction with the electrolyte. On the other hand, when the second layer is formed by the ALD method, the thickness of the second layer sometimes depends on the distance from the first main surface if a thickness of the cathode foil exceeds, for example, 50 μm, but a uniform and dense film having few defects can be formed. Thus, by using the ALD method, it is possible to easily cover the surface of the metal framework with the second layer that is dense and has few defects.

A third layer containing at least one of phosphorus or nitrogen may adhere to a region exceeding a depth of 10% of the thickness of the metal porous part in the thickness direction of the metal porous part. The third layer can also adhere to the deep portion at the side close to the metal core part in the metal porous part where the coating film including the first layer and/or the second layer is not formed. The third layer contains phosphorus and/or nitrogen, and thus, has high solvent resistance to various solvents (particularly, moisture) constituting a liquid component (for example, an electrolytic solution). Further, when the first layer and/or the second layer is formed using the ALD method, the adhesion between the metal framework and the first layer and/or the second layer is enhanced as well as covering performance of the first layer and/or the second layer.

In particular, in a case where the liquid component has a pH less than 7 and is acidic, the cathode foil is easily degraded, for example, by being corroded when the acidic liquid component comes into contact with the metal framework portion of the metal porous part or the metal core part. Thus, the degradation of the cathode foil can be suppressed by providing the third layer. Since the third layer is provided, an excellent degradation suppressing effect of the cathode body can be obtained even when the pH of the liquid component is less than 5. Further, moisture resistance can be enhanced even in a case of use in a high temperature and high humidity environment with a temperature equal to or more than 85° C. and a humidity equal to or more than 85%, for example.

Further, the hydration reaction of the metal framework portion or the metal core part can be suppressed even in a case where the liquid component contains water. For example, the liquid component may contain moisture in a range from 3% by mass to 15% by mass, inclusive. Even in such a case, the hydration reaction is suppressed since the third layer contains phosphorus and/or nitrogen. Thus, the degradation of the cathode foil can be suppressed even in a case where the liquid component contains moisture since the third layer is provided.

The third layer may be further interposed between the metal porous part and the coating film including the first layer and/or the second layer. Even when a crack or the like occurs in the coating film, the metal framework portion of the metal porous part is prevented from being exposed and brought into contact with the liquid component since the surface of the metal porous part is covered with the third layer. Thus, the degradation of the cathode foil can be suppressed, and an increase in ESR can be suppressed.

In a case where the coating film includes the second layer, the second layer may also contain phosphorus and/or nitrogen. In a case where the third layer is also interposed between the coating film and the metal porous part, the third layer may form a part or the whole of the second layer in the coating film.

The third layer can be attached to the inner walls of the pores, for example, by impregnating the roughened cathode foil with a solution containing a compound containing phosphorus and/or nitrogen (for example, ammonium phosphate solution), and thereafter, drying the resultant by a heat treatment. When an anodizing solution contains a phosphorus compound and/or a nitrogen compound, the impregnation with the solution may be performed simultaneously with or in parallel with the anodizing treatment. The anodizing treatment may be performed before the formation of the first layer and/or the second layer, or may be performed after the formation of the first layer and/or the second layer.

Figure 1:
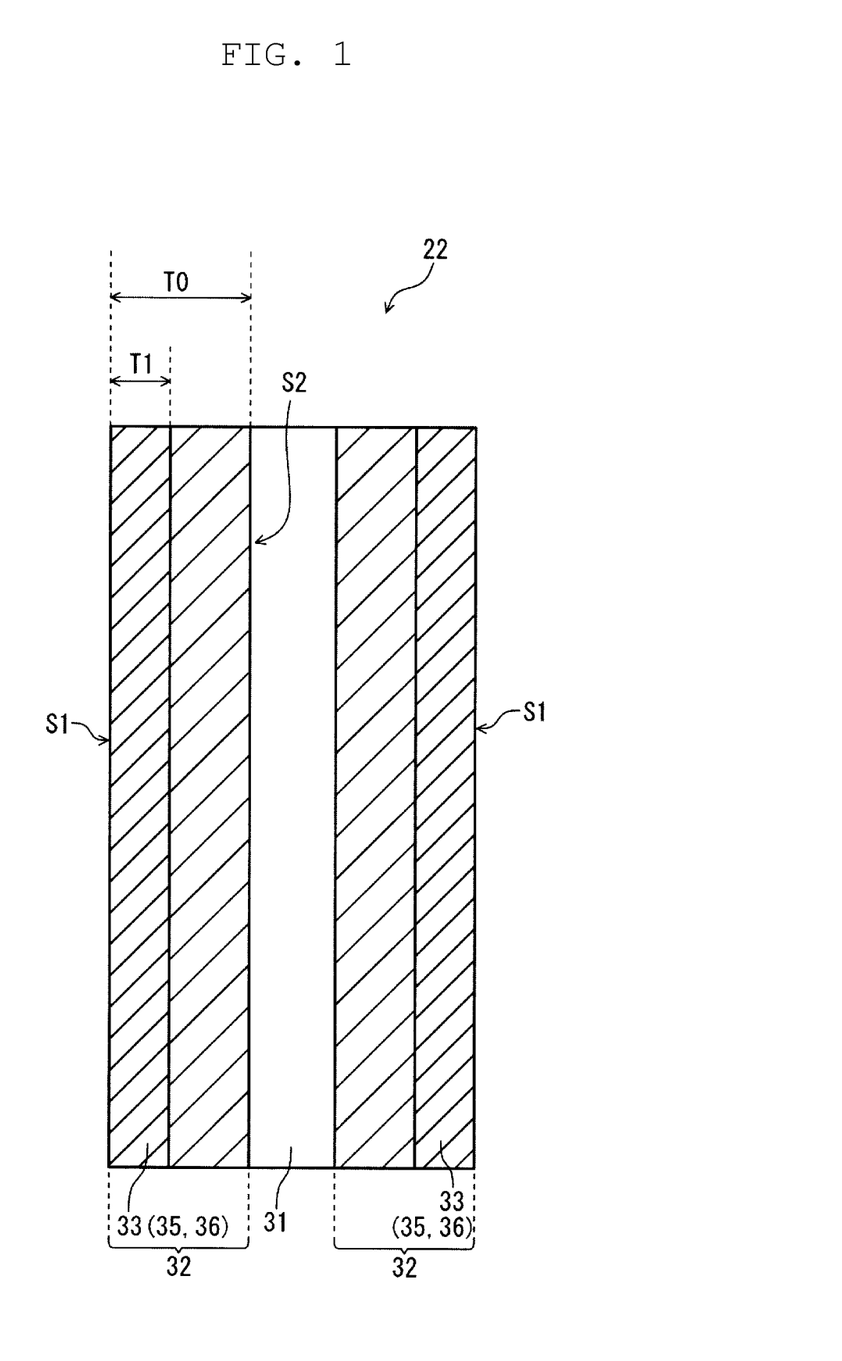
FIG. 1 is a sectional view schematically illustrating a configuration of a cathode foil for electrolytic capacitors according to an exemplary embodiment of the present disclosure.

FIG. 1 is a schematic sectional view illustrating the cathode foil according to the exemplary embodiment of the present disclosure. Cathode foil 22 is an integrated body of metal core part 31 and metal porous part 32. And pores of metal porous part 32 are open at first main surface S1. Metal porous part 32 has second main surface S2 at a boundary with metal core part 31. A thickness (depth from first main surface S1) (that is, distance between first main surface S1 and second main surface S2) of metal porous part 32 is indicated by T0.

Metal porous part 32 has pits or pores surrounded by a metal framework. In a region of metal porous part 32 having a predetermined thickness (depth) from first main surface S1, coating film 33 is formed so as to cover the surface of the metal framework of metal porous part 32 (see FIGS. 2 to 4). Coating film 33 can include first layer 35 and/or second layer 36. Thickness T1 of the region of metal porous part 32 where coating film 33 is formed is more than or equal to 10% of thickness T0 of metal porous part 32 (T1≥0.1T0). Thickness T1 may be more than or equal to 30% of thickness T0.

In the present exemplary embodiment, both first layer 35 and second layer 36 can be formed in a region exceeding a depth of 10% or more of thickness T0 of metal porous part 32 from first main surface S1. Meanwhile, at least one of first layer 35 or second layer 36 may be formed in the region exceeding the depth of 10% or more of thickness T0 of metal porous part 32 from first main surface S1. At least first layer 35 is preferably formed in the region exceeding the depth of 10% or more of thickness T0 of metal porous part 32 from first main surface S1.

The thickness of the metal porous part is not particularly limited, and may be appropriately selected according to the application of the electrolytic capacitor, a required withstand voltage, and the like. The thickness of the metal porous part can range, for example, from 1 μm to 60 μm, inclusive. Further, thickness T0 of the metal porous part can be, for example, more than or equal to 1/10 and less than 5/10 of a thickness of the cathode foil. Note that thickness T0 of the metal porous part may be obtained by cutting the cathode foil so as to obtain a cross section in a thickness direction of the metal core part and the metal porous part, capturing an electron micrograph of the cross section, and calculating an average value of thicknesses at any ten points of the metal porous part. Thickness T1 is obtained as an average value of the thicknesses of any ten points in a region of the metal porous part where coating film 33 having a thickness more than or equal to 1 nm is observed in the electron micrograph.

Figure 2:
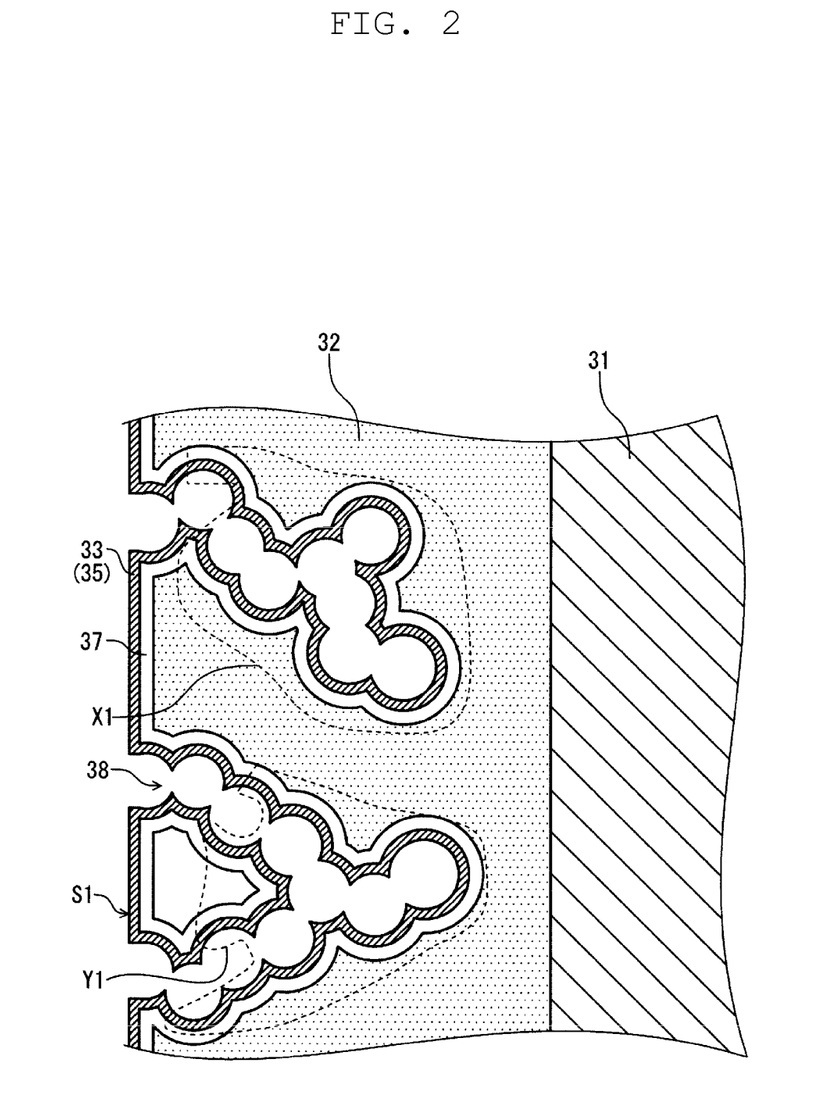
FIG. 2 is a schematic sectional view illustrating a part of a metal porous part of the cathode foil for electrolytic capacitors in an enlarged manner.

FIG. 2 is a schematic sectional view illustrating a region in the vicinity of first main surface S1 of metal porous part 32 in cathode foil 22 in an enlarged manner. FIG. 2 illustrates the pores of the metal porous part and first layer 35 and third layer 37 with emphasis for the sake of description. The scale of each component (particularly, film thicknesses of first layer 35 and third layer 37) in the drawing does not match the actual scale. The same also applies to FIGS. 3 and 4 to be described below.

As illustrated in FIG. 2, cathode foil 22 has first main surface S1 that is roughened, and pores 38 are formed in the roughened main surface. Pores 38 are formed deep inside metal porous part 32 while being winding and branching from first main surface S1. Inner walls of pores 38 are covered with coating film 33 including first layer 35.

A thickness of first layer 35 is substantially uniform, but can become thicker at a side closer to first main surface S1 (more precisely, as the shortest distance to first main surface S1 through pores 38 decreases). First layer 35 also adheres to a region (region X1 and region Y1 in FIG. 2) that is not exposed from first main surface S1 and is shaded from the outside by the metal framework of metal porous part 32. Such coating film 33 is obtained by forming first layer 35 by the ALD method.

Third layer 37 is formed between coating film 33 and the metal framework of metal porous part 32. Third layer 37 contains phosphorus and/or nitrogen and has water resistance. Further, although not illustrated, third layer 37 can also be formed in a deep portion (a region where a depth from first main surface S1 exceeds T1) of metal porous part 32 where coating film 33 is not formed.

Figure 3:
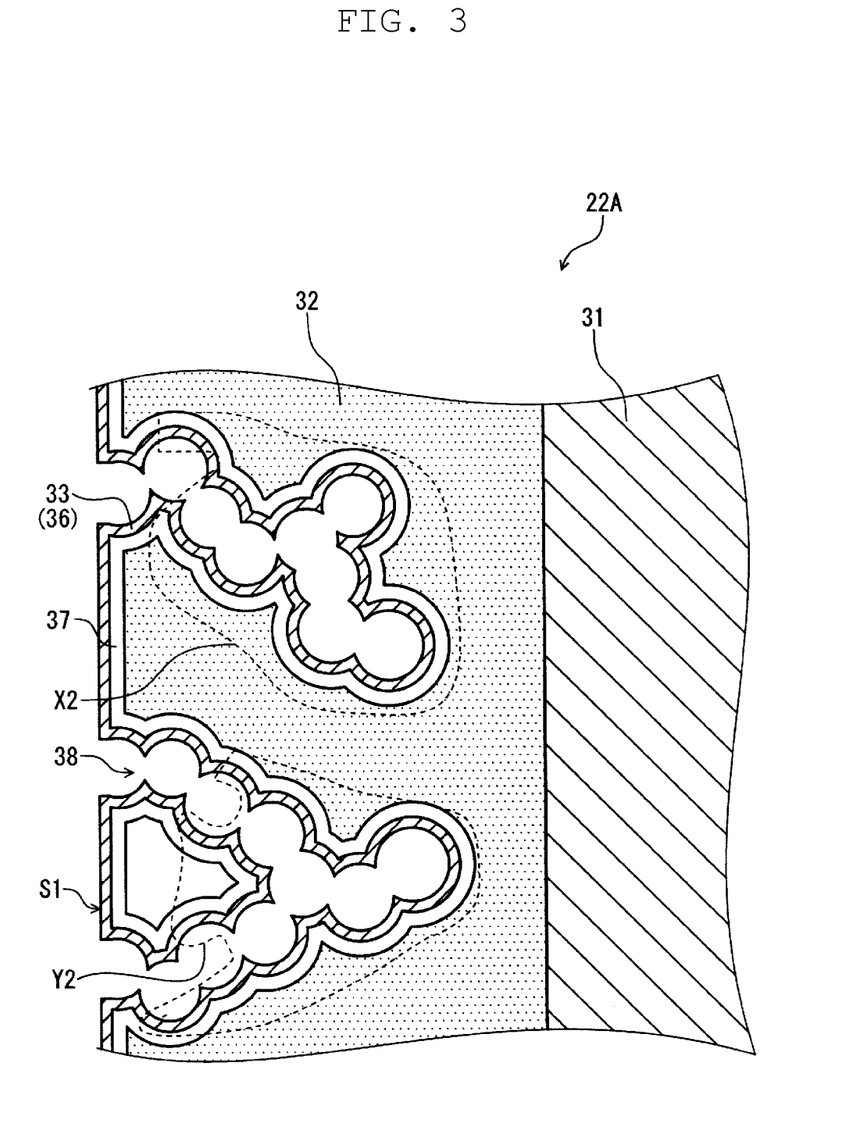
FIG. 3 is a schematic sectional view illustrating another example of the cathode foil for electrolytic capacitors corresponding to FIG. 2.

FIG. 3 illustrates another example of the cathode foil according to the exemplary embodiment of the present disclosure. FIG. 3 is a schematic sectional view illustrating a region in the vicinity of first main surface S1 of metal porous part 32 in an enlarged manner, which is similar to FIG. 2. FIG. 3 illustrates the pores, second layer 36 and third layer 37 of the metal porous part with emphasis for the sake of description. The scale of each component (particularly, the film thicknesses of second layer 36 and the third layer 37) in the drawing does not match the actual scale. The same also applies to FIG. 4 to be described below.

Cathode foil 22A illustrated in FIG. 3 has first main surface S1 that is roughened, and pores 38 are formed in the roughened main surface, which is similar to FIG. 2. Inner walls of pores 38 are covered with coating film 33 including second layer 36.

A thickness of second layer 36 is substantially uniform, but can become thicker at a side closer to first main surface S1 (more precisely, as the shortest distance to first main surface S1 through pores 38 decreases). Second layer 36 also adheres to a region (region X2 and region Y2 in FIG. 3) that is not exposed from first main surface S1 and is shaded from the outside by the metal framework of metal porous part 32. Such coating film 33 is obtained by forming second layer 36 by the ALD method. Third layer 37 is formed between coating film 33 and the metal framework of metal porous part 32, which is similar to FIG. 2. Although not illustrated, third layer 37 can also be formed in a deep portion (a region where a depth from first main surface S1 exceeds T1) of metal porous part 32 where coating film 33 is not formed.

Figure 4:
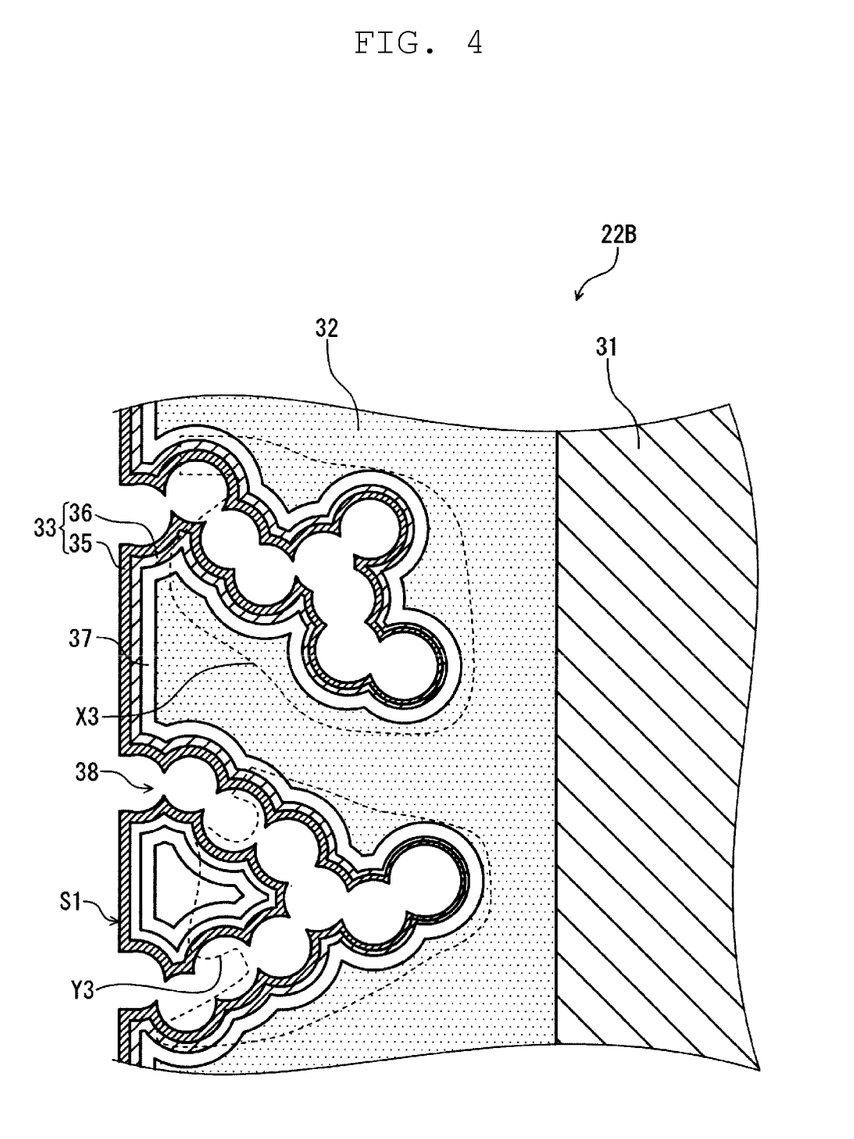
FIG. 4 is a schematic sectional view illustrating still another example of the cathode foil for electrolytic capacitors corresponding to FIG. 2.

FIG. 4 illustrates still another example of the cathode foil according to the exemplary embodiment of the present disclosure. FIG. 4 is a schematic sectional view illustrating a region in the vicinity of first main surface S1 of metal porous part 32 in an enlarged manner, which is similar to FIGS. 2 and 3. In cathode foil 22B illustrated in FIG. 4, inner walls of pores 38 are covered with coating film 33 including first layer 35 and second layer 36. First layer 35 covers second layer 36.

Thicknesses of first layer 35 and second layer 36 are formed to be thicker at a side closer to first main surface S1 (more precisely, as the shortest distance to first main surface S1 through pores 38 decreases). First layer 35 and second layer 36 also adhere to a region (region X3 and region Y3 in FIG. 4) that is not exposed from first main surface S1 and is shaded from the outside by the metal framework of metal porous part 32. Third layer 37 is formed between coating film 33 and the metal framework of metal porous part 32, which is similar to FIGS. 2 and 3. Although not illustrated, third layer 37 can also be formed in a deep portion (a region where a depth from first main surface S1 exceeds T1) of metal porous part 32 where coating film 33 is not formed.

A film thickness of first layer 35 ranges, for example, from 1 nm to 50 nm, inclusive, and may range from 1 nm to 30 nm, inclusive. A film thickness of second layer 36 ranges, for example, from 1 nm to 10 nm, inclusive. A film thickness of coating film 33 (a total film thickness of the first layer and the second layer) ranges, for example, from 2 nm to 60 nm, inclusive. Note that these film thicknesses are obtained as an average value of film thicknesses at any ten points in a region of a surface layer having a depth less than or equal to 100 nm from first main surface S1 in an electron micrograph of a cross section of metal porous part 32 in the thickness direction.

A film thickness of third layer 37 is, for example, less than or equal to 2 nm, and may range from 0.08 nm to 2 nm, inclusive. The film thickness of third layer 37 is obtained as an average value of film thicknesses at any ten points in the electron micrograph of the cross section of metal porous part 32 in the thickness direction.

A concentration of phosphorus or nitrogen contained in the third layer ranges, for example, preferably from 0.5 at % to 7.0 at %, inclusive, and more preferably from 1.0 at % to 5.0 at %, inclusive, from the viewpoint of suppressing degradation of the cathode foil. Note that the concentration of phosphorus or nitrogen contained in the third layer is obtained by observing a cross section of the cathode foil cut in the thickness direction with a transmission electron microscope (TEM), and performing composition analysis on a desired region of the cathode foil with an X-ray microanalyzer (XMA). The concentration of phosphorus or nitrogen is obtained by calculating an average of measured values at any ten points.

A kind of metal constituting the metal core part and the metal porous part is not particularly limited, but is preferably a valve metal, for example, aluminum, tantalum, niobium, or the like.

The roughening of the cathode foil (formation of the metal porous part) is preferably performed by etching a metal foil. Further, the cathode foil may be subjected to an anodizing treatment to form an oxide film (second layer) on the surface of the cathode foil if necessary.

A pore diameter peak of the pit or pore of the metal porous part is not particularly limited, but may range, for example, from 50 nm to 2000 nm, inclusive, or from 100 nm to 300 nm, inclusive, from the viewpoint of increasing a surface area and forming the first layer or the second layer up to the deep portion of the metal porous part. The pore diameter peak is a most frequent pore diameter of a volume-based pore diameter distribution measured by, for example, a mercury porosimeter.

Conductive materials for forming the first layer include metal or a conductive metal compound in addition to amorphous carbon as one that can be formed by the ALD method. As the metal and the metal compound, preferred is one that is less likely to form a passive film by, for example, contact with air. Examples of the metal include silver, gold, titanium, a titanium alloy, nickel, and a nickel alloy. Examples of the metal compound include a nitride and a carbide, and the nitride is preferable. Examples of the metal constituting the metal compound can include titanium and/or nickel. The first layer may contain one kind or two or more kinds of these materials.

When the first layer and the second layer are formed, the first layer may be formed in a shallow region in the vicinity of first main surface S1 as long as a thickness of a region where the second layer is formed is more than or equal to 10% of thickness T0 of metal porous part 22. In such a case, a method for forming the first layer is not limited to the ALD method, and a gas phase method such as chemical gas phase vapor deposition, vacuum vapor deposition, sputtering, or ion plating may be used.

An element (second element) other than oxygen contained in the oxide film forming the second layer may be the same as or different from a metal element constituting the metal porous part.

When the coating film including the first layer and the second layer is formed, in the metal porous part, the thickness (depth) of the region where the first layer is formed may be made to be larger than the thickness (depth) of the region where the second layer is formed. In this case, it is also possible to electrically connect the first layer to a metal framework portion at the side close to the metal core part in the metal porous part. This makes it easy to prevent generation of a cathode-side capacitance caused by the second layer.

[Electrolytic Capacitor]

An electrolytic capacitor according to the present exemplary embodiment includes the above-described cathode foil for electrolytic capacitors, an anode body including a dielectric layer disposed on a surface of the anode body, and an electrolyte. Hereinafter, components of the electrolytic capacitor other than the cathode foil will be described in detail.

(Anode Body)

As the anode body, a metal foil can be used. A kind of metal contained in the metal foil is not particularly limited, but those containing a valve metal, such as aluminum, tantalum, niobium, or titanium, is preferable from the viewpoint of easy formation of the dielectric layer. Among them, those containing the second metal as a main component, for example, an elemental metal such as aluminum and an alloy such as an aluminum alloy are preferable. A surface of the anode body is roughened, and the dielectric layer is formed on the roughened surface of the metal foil.

(Separator)

In the electrolytic capacitor using an electrolytic solution as the electrolyte, a separator can be used to separate the anode body and the cathode foil from each other. As a material for the separator, it is possible to use, for example, a nonwoven fabric or a film containing, as a main component, cellulose, polyethylene terephthalate, polybutylene terephthalate, polyphenylenesulfide, vinylon, nylon, aromatic polyamide, polyimide, polyamideimide, polyetherimide, rayon, or a vitreous material.

(Electrolyte)

The electrolyte may contain a liquid component and/or a solid electrolyte. In a case where the electrolyte does not contain the solid electrolyte, the liquid component is an electrolytic solution. In a case where the electrolyte contains the solid electrolyte, the liquid component may be the electrolytic solution or is not necessarily the electrolytic solution. The liquid component can have an action of enhancing restoration performance of the dielectric layer formed on the surface of the anode body at the anode side of the electrolytic capacitor. As the solid electrolyte, a conductive polymer can be used.

(Conductive Polymer)

The conductive polymer is preferably, for example, polypyrrole, polythiophene, or polyaniline. A single one or two or more kinds in combination of these conductive polymers may be used, or a copolymer of two or more kinds of monomers may also be used. A weight-average molecular weight of the conductive polymer is not particularly limited and ranges from 1000 to 100000, inclusive, for example.

In the present description, polypyrrole, polythiophene, polyaniline, and the like mean polymers having polypyrrole, polythiophene, polyaniline, and the like as a basic skeleton, respectively. Therefore, polypyrrole, polythiophene, polyaniline, and the like may include their respective derivatives. Examples of polythiophene include poly (3,4-ethylenedioxythiophene) (PEDOT) and the like.

A dopant may be added to the conductive polymer. It is desirable to use a polymer dopant, from a viewpoint of suppressing dedoping of the dopant from the conductive polymer. Examples of the polymer dopant include an anion of, for example, polyvinyl sulfonic acid, polystyrenesulfonic acid, polyallylsulfonic acid, polyacrylsulfonic acid, polymethacrylsulfonic acid, poly(2-acrylamido-2-methylpropanesulfonic acid), polyisoprenesulfonic acid, and polyacrylic acid. A single one or two or more kinds in combination of these polymer dopants may be used. These polymer dopants may be a homopolymer or a copolymer of two or more kinds of monomers. Particularly, polystyrenesulfonic acid (PSS) is preferable.

A weight-average molecular weight of the dopant is not particularly limited but preferably ranges, for example, from 1000 to 100000, inclusive, in terms of facilitating formation of a homogeneous solid electrolyte layer.

(Liquid Component)

The liquid component may be a nonaqueous solvent or a mixture of a nonaqueous solvent and an ionic substance (a solute such as an organic salt) dissolved in the nonaqueous solvent (that is, an electrolytic solution). The nonaqueous solvent may be an organic solvent or an ionic liquid. The nonaqueous solvent is preferably a high boiling point solvent. Examples of the nonaqueous solvent include polyhydric alcohols such as ethylene glycol and propylene glycol, cyclic sulfones such as sulfolane (SL), lactones such as γ-butyrolactone (GBL), amides such as N-methylacetamide, N,N-dimethylformamide, and N-methyl-2 pyrrolidone, esters such as methyl acetate, carbonate compounds such as propylene carbonate (PC), ethers such as 1,4-dioxane, ketones such as methyl ethyl ketone, and formaldehyde. As the high boiling point solvent, a polymer solvent may be used.

Examples of the polymer solvent include a polyalkylene glycol, a derivative of the polyalkylene glycol, and a compound obtained by substituting at least one hydroxy group of a polyol with a polyalkylene glycol (including a derivative). Specific examples of the polymer solvent include polyethylene glycol (PEG), polyethylene glycol glyceryl ether, polyethylene glycol diglyceryl ether, polyethylene glycol sorbitol ether, polypropylene glycol, polypropylene glycol glyceryl ether, polypropylene glycol diglyceryl ether, polypropylene glycol sorbitol ether, and polybutylene glycol. A single one or two or more kinds in combination of these polymer solvents may be used. Further, the polymer solvent may be, for example, a solvent such as an ethylene glycol-propylene glycol copolymer, an ethylene glycol-butylene glycol copolymer, or a propylene glycol-butylene glycol copolymer. The copolymer may be a random copolymer.

The liquid component may contain an acid component and a base component. As the acid component, a polycarboxylic acid and a monocarboxylic acid can be used. Examples of the polycarboxylic acid include aliphatic polycarboxylic acids ([saturated polycarboxylic acids such as oxalic acid, malonic acid, succinic acid, glutaric acid, adipic acid, pimelic acid, suberic acid, azelaic acid, sebacic acid, 1,6-decanedicarboxylic acid, and 5,6-decanedicarboxylic acid]; and [unsaturated polycarboxylic acids such as maleic acid, fumaric acid, and itaconic acid]), aromatic polycarboxylic acids (such as phthalic acid, isophthalic acid, terephthalic acid, trimellitic acid, and pyromellitic acid), and alicyclic polycarboxylic acids (such as cyclohexane-1,2-dicarboxylic acid and cyclohexene-1,2-dicarboxylic acid). Examples of the monocarboxylic acid include aliphatic monocarboxylic acids (1 to 30 carbon atoms) ([saturated monocarboxylic acids such as formic acid, acetic acid, propionic acid, butyric acid, isobutyric acid, valeric acid, caproic acid, enanthic acid, caprylic acid, pelargonic acid, lauric acid, myristic acid, stearic acid, and behenic acid]; and [unsaturated monocarboxylic acids such as acrylic acid, methacrylic acid, and oleic acid]), aromatic monocarboxylic acids (such as benzoic acid, cinnamic acid, and naphthoic acid), and oxycarboxylic acids (such as salicylic acid, mandelic acid, and resorcinol acid). Among these, maleic acid, phthalic acid, benzoic acid, pyromellitic acid, and resorcinol acid have high conductance and are thermally stable, and are preferably used.

Examples of the inorganic acid include a carbon compound, a hydrogen compound, a boron compound, a sulfur compound, a nitrogen compound, and a phosphorus compound. Typical examples of the inorganic acid include phosphoric acid, phosphorous acid, hypophosphorous acid, alkyl phosphoric acid ester, boric acid, fluoroboric acid, tetrafluoroboric acid, hexafluorophosphoric acid, benzenesulfonic acid, and naphthalenesulfonic acid. Further, a composite compound of an organic acid and an inorganic acid can be used as the acid component. Examples of the composite compound include borodiglycolic acid, borodioxalic acid, and borodisalicylic acid.

The base component is a compound having an alkyl-substituted amidine group, and examples of the base component include an imidazole compound, a benzimidazole compound, and an alicyclic amidine compound (a pyrimidine compound and an imidazoline compound). Specifically, preferred are 1,8-diazabicyclo[5,4,0]undecene-7, 1,5-diazabicyclo[4,3,0]nonene-5, 1,2-dimethylimidazolinium, 1,2,4-trimethylimidazoline, 1-methyl-2-ethylimidazoline, 1,4-dimethyl-2-ethylimidazoline, 1-methyl-2-heptylimidazoline, 1-methyl-2-(3'heptyl)imidazoline, 1-methyl-2-dodecylimidazoline, 1,2-dimethyl-1,4,5,6-tetrahydropyrimidine, 1-methylimidazole, and 1-methylbenzimidazole that have high conductance and are capable of providing a capacitor excellent in impedance performance.

As the base component, it is also possible to use a quaternary salt of the compound having an alkyl-substituted amidine group, and examples of the quaternary salt include an imidazole compound, a benzimidazole compound, and an alicyclic amidine compound (a pyrimidine compound or an imidazoline compound) that are quaternized by an alkyl group or an arylalkyl group having 1 to 11 carbon atoms. Specifically, preferred are 1-methyl-1,8-diazabicyclo[5,4,0] undecene-7, 1-methyl-1,5-diazabicyclo[4,3,0]nonene-5, 1,2, 3-trimethylimidazolinium, 1,2,3,4-tetramethylimidazolinium, 1,2-dimethyl-3-ethyl-imidazolinium, 1,3,4-trimethyl-2-ethylimidazolinium, 1,3-dimethyl-2-heptylimidazolinium, 1,3-dimethyl-2-(3'heptyl) imidazolinium, 1,3-dimethyl-2-dodecylimidazolinium, 1,2, 3-trimethyl-1,4,5,6-tetrahydropyrimidium, 1,3-dimethylimidazolium, 1-methyl-3-ethylimidazolium, and 1,3-dimethylbenzimidazolium that have high conductance and are capable of providing a capacitor excellent in impedance performance.

Further, a tertiary amine can also be used as the base component, and examples of the tertiary amine include trialkylamines (such as trimethylamine, dimethylethylamine, methyldiethylamine, triethylamine, dimethyl-n-propylamine, dimethylisopropylamine, methylethyl-n-propylamine, methylethylisopropylamine, diethyl-n-propylamine, diethylisopropylamine, tri-n-propylamine, triisopropylamine, tri-n-butylamine, and tri-tert-butylamine) and phenyl group-containing amines (such as dimethylphenylamine, methylethylphenylamine, and diethylphenylamine). Among them, trialkylamines are preferable in terms of high conductance, and it is more preferable to contain at least one selected from the group consisting of trimethylamine, dimethylethylamine, methyldiethylamine, and triethylamine. As the base component, a secondary amine such as dialkylamines, a primary amine such as a monoalkylamine, or ammonia may also be used.

The liquid component may contain the acid component, the base component, and/or a salt of the acid component and the base component. The salt may be an inorganic salt or an organic salt. The organic salt is a salt in which at least one of an anion or a cation contains an organic substance. Examples of the organic salt include trimethylamine maleate, triethylamine borodisalicylate, ethyldimethylamine phthalate, mono 1,2,3,4-tetramethylimidazolinium phthalate, and mono 1,3-dimethyl-2 ethylimidazolinium phthalate.

A pH of the liquid component may be less than 7 or less than or equal to 5. When the pH of the liquid component is set within the above range, dedoping of the dopant of the conductive polymer can be suppressed. Meanwhile, in a case where the pH of the liquid component is less than 7, the cathode foil is easily degraded. In this case, it is preferable to form the third layer on the surface of the metal porous part of the cathode foil. The third layer containing phosphorus and/or nitrogen can suppress the degradation of the cathode foil. Further, it is possible to suppress the degradation of the cathode foil even in a case where borodioxalic acid, borodiglycolic acid, or borodisalicylic acid, which easily corrodes the metal of the cathode foil, such as aluminum, is added to the liquid component.

Figure 5:
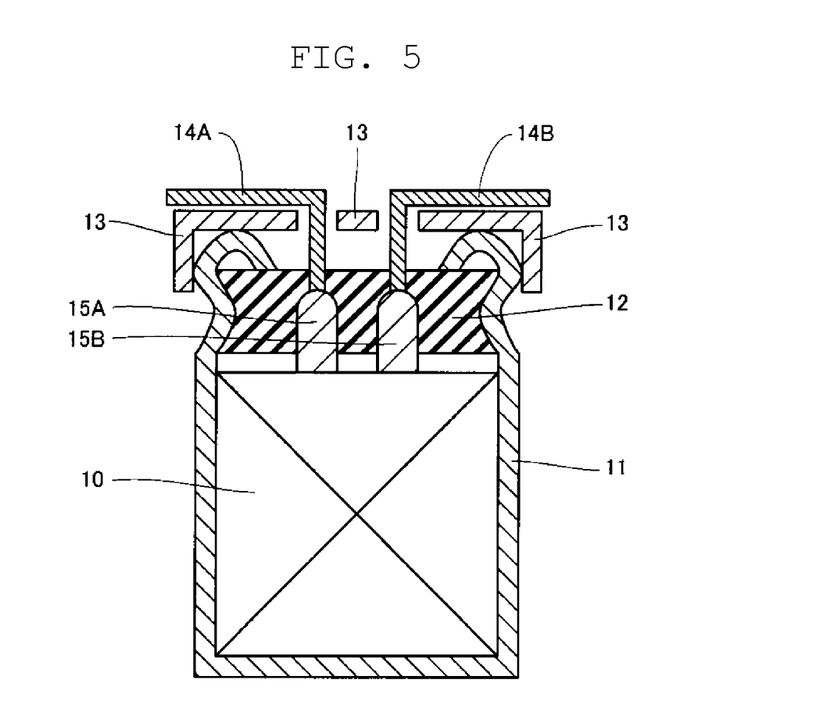
FIG. 5 is a sectional view schematically illustrating an electrolytic capacitor according to an exemplary embodiment of the present disclosure.
Figure 6:
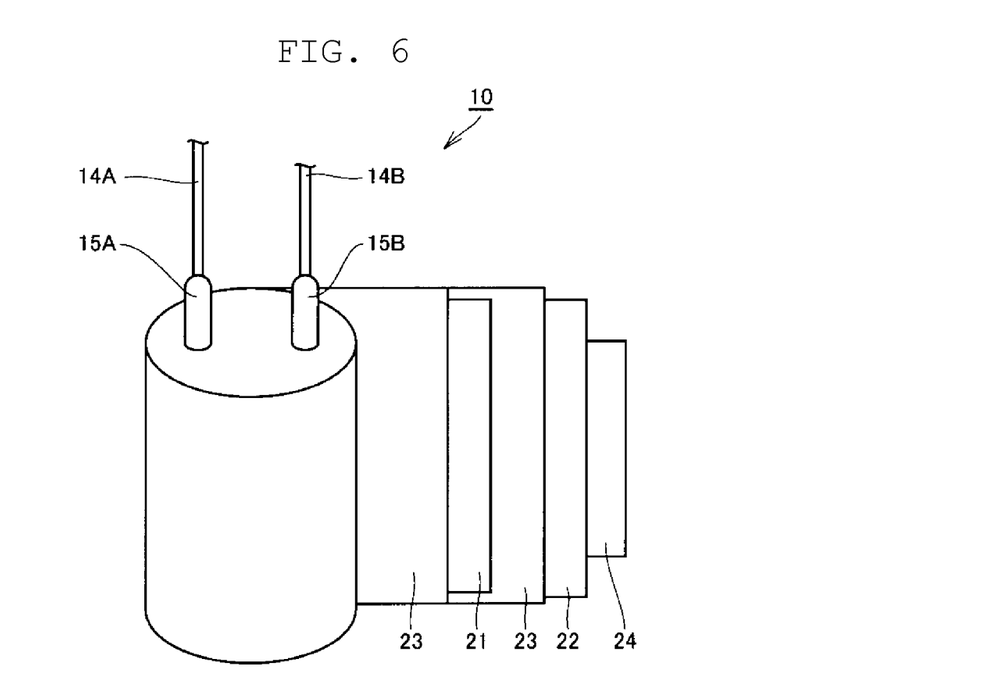
FIG. 6 is a schematic view obtained by partially developing a wound body included in the electrolytic capacitor.

FIG. 5 is a schematic sectional view of the electrolytic capacitor according to the present exemplary embodiment, and FIG. 6 is a schematic view obtained by partially developing a wound body included in the electrolytic capacitor. Meanwhile, the following exemplary embodiment does not limit the present disclosure.

As illustrated in FIG. 5, the electrolytic capacitor includes, for example, capacitor element 10, bottomed case 11 that houses capacitor element 10, sealing member 12 that closes an opening of bottomed case 11, seat plate 13 that covers sealing member 12, lead wires 14A, 14B led out from sealing member 12 and penetrating seat plate 13, lead tabs 15A, 15B respectively connecting the lead wires and electrodes of capacitor element 10, and a liquid component (not illustrated). Capacitor element 10 is housed in an outer case together with the liquid component. The vicinity of an opening end of bottomed case 11 is drawn inward, and the opening end is curled to be caulked to sealing member 12.

Capacitor element 10 is produced by, for example, attaching a conductive polymer to a wound body illustrated in FIG. 6. The wound body includes anode body 21 having the dielectric layer, cathode body (cathode foil) 22 containing a first metal of a valve metal, and separator 23 interposed therebetween. The conductive polymer is attached so as to cover at least a part of the surface of the dielectric layer of anode body 21. Capacitor element 10 further includes lead tab 15A connected to anode body 21 and lead tab 15B connected to cathode body 22.

Anode body 21 and cathode body 22 are wound with separator 23 interposed therebetween. The outermost circumference of the wound body is fixed with winding stop tape 24. Note that FIG. 6 illustrates a state in which a part of the wound body is developed before the outermost circumference of the wound body is fixed. Anode body 21 includes a metal foil whose surface has been roughened to have irregularities, and a dielectric layer is formed on the main surface of the metal foil having irregularities.

Although the winding-type electrolytic capacitor has been described in the above exemplary embodiment, the scope of application of the present disclosure is not limited to the above. The present disclosure can also be applied to other electrolytic capacitors including, for example, a chip-type electrolytic capacitor using a sintered metal body as an anode body and a laminated-type electrolytic capacitor using a metal plate as an anode body.

[Methods Respectively for Producing Cathode Foil for Electrolytic Capacitors and Electrolytic Capacitor]

Hereinafter, examples of methods respectively for producing the above-described cathode foil for electrolytic capacitors and electrolytic capacitor will be described for each step.

The method for producing a cathode foil for electrolytic capacitors according to the present exemplary embodiment includes, for example, step (i) of preparing a metal substrate having a metal porous part and a metal core part that is continuous with the metal porous part, and step (ii) of forming a coating film on a surface of a metal portion constituting the metal porous part of the metal substrate. In step (ii), the coating film is formed by an atomic layer deposition (ALD) method. The producing method may further include step (iii) of causing at least one of phosphorus or nitrogen to adhere to a region of the metal porous part that exceeds a depth of 10% of the thickness of the metal porous part in the thickness direction of the metal porous part.

An electrolytic capacitor can be produced by a method including a step of obtaining a cathode foil for electrolytic capacitors using the above-described steps, step (iv) of preparing an anode body including a dielectric layer on a surface of the anode body, and step (v) of forming a capacitor element using the anode body and the cathode foil.

Step (i)

Step (i) of preparing the metal substrate may be, for example, a step of roughening a metal foil. Through the roughening, a metal porous part having a plurality of pits or pores is formed at a surface side of the metal foil. At the same time, a metal core part integrated with the metal porous part is formed in an inner portion of the metal foil. The roughening can be performed by a publicly known method, and the roughening may be performed by etching. The etching can be performed by, for example, direct current etching using direct current or alternating current etching using alternating current.

A kind of metal forming the metal foil is not particularly limited, but it is possible to use a valve metal such as aluminum (Al), tantalum (Ta), or niobium (Nb), or an alloy containing the valve metal. A thickness of the metal foil is not particularly limited, and ranges, for example, from 15 µm to 100 µm, inclusive.

Step (ii)

Step (ii) of forming the coating film can include a step of forming a conductive first layer containing a first element and/or a step of forming a second layer that is an oxide film containing a second element. The first element may be at least one element selected from the group consisting of carbon, nickel, silver, and gold. The second element may be at least one element selected from the group consisting of aluminum, titanium, silicon, tantalum, niobium, hafnium, and zirconium. Both the first layer and the second layer may be formed. In such a case, the formation of the first layer is performed after the formation of the second layer.

The first layer and the second layer can be formed by, for example, an atomic layer deposition (ALD) method. The coating film that is dense and has few defects can be formed up to the inner depth of the pore, which is winding, in a deep portion of the metal porous part by using the ALD method. The first layer and the second layer can also adhere to an inner wall of the pore that is not exposed from the outer surface of the foil (that is, is shaded from the outside by the metal framework of the metal porous part). On the other hand, in a case where the coating film including the first layer and/or the second layer is formed using a gas phase method such as vacuum vapor deposition or sputtering, it is difficult to form the coating film in a region, which is not exposed from the outer surface of the metal porous part, in the deep portion of the metal porous part although the coating film can be formed so as to cover the inner wall of the pore in a shallow region in the vicinity of the outer surface of the foil.

In the ALD method, a precursor material for forming the coating film can reach a region that is away from the outer surface to some extent through the pores of the metal porous part. However, it becomes more difficult for the precursor material to reach a region that is farther from the outer surface of the foil. For this reason, the coating film formed on the metal porous part may have a distribution in which the film thickness is thicker at a side close to the outer surface of the foil and is thinner as being away from the outer surface. The film thickness (film thickness of the first layer and/or the second layer) of the coating film at an arbitrary position of the metal porous part depends on a length of the shortest path to the outer surface through the pores of the metal porous part, and does not necessarily depend on the shortest distance to the outer surface, but is generally formed to be thicker as the distance from the outer surface of the foil decreases.

According to the ALD method, a source gas containing the first element or the second element can be supplied to a reaction chamber in which an object is disposed, and the conductive first layer containing the first element or the second layer that is the oxide film of the second element can be formed on a surface of the object. In the ALD method, a self-limiting action functions, so that the first element or the second element is deposited on the surface of the object in units of atomic layers. Thus, the thicknesses of the first layer and the second layer can be controlled by the number of cycles in which supply of the source gas and exhaust (purge) of the source gas are performed in this order as one cycle. That is, the thickness of the first layer and/or the second layer can be easily controlled using the ALD method.

The first element or the second element is supplied to the reaction chamber as a gas of a precursor containing the first element or the second element. The precursor is, for example, an organometallic compound containing the first element or the second element, and thus, each of the elements is easily chemically adsorbed to the object. As the precursor, various organometallic compounds, conventionally used in the ALD method, can be used.

When the second layer is formed by the ALD method, the source gas containing the second element and an oxidant are alternately supplied to the reaction chamber. The thickness of the second layer is controlled by the number of cycles in which supply of the source gas, exhaust (purge) of the source gas, supply of the oxidant, and exhaust (purge) of the oxidant are performed in this order as one cycle. Examples of the oxidant include water, oxygen, ozone, and the like. The oxidant may be supplied to the reaction chamber as plasma using the oxidant as a raw material.

The ALD method can be performed under a temperature condition ranging from 100° C. to 400° C., inclusive, as compared with CVD generally performed under a temperature condition ranging from 400° C. to 900° C., inclusive. That is, the ALD method is excellent in that thermal damage to the metal foil can be suppressed.

Examples of the precursor containing carbon (C) that can be used for the formation of the first layer include alkanes having 5 to 11 carbon atoms such as hexane.

Further, examples of the precursor containing Ni include bis(cyclopentadienyl)nickel ($Ni(C_5H_5)_2$), bis(isopropylcyclopentadienyl)nickel ($Ni(i-C_3H_7C_4H_5)_2$), bis(ethylcyclopentadienyl)nickel ($Ni(C_2H_5C_4H_5)_2$), and tetrakis(trifluorophosphine)nickel ($Ni(PF_3)_4$).

Examples of the precursor containing Ag include 2,2,6,6-tetramethylheptane-3,5-dionate silver(I) ($Ag(C_{11}H_{19}O_2)$) and the like, and examples of the precursor containing Au include dimethyl(acetylacetonate)gold(III) ($Au((CH_3)_2)C_5H_7O_2$) and the like.

Examples of the precursor containing Al that can be used to form the second layer include trimethylaluminum ($(CH_3)_3Al$) and the like.

Examples of the precursor containing Ti include bis(t-butylcyclopentadienyl)titanium(IV) dichloride ($C_{18}H_{26}Cl_2Ti$), tetrakis(dimethylamino)titanium(IV) ($[(CH_3)_2N]_4Ti$, TDMAT), tetrakis(diethylamino)titanium (IV) ($[(C_2H_5)_2N]_4Ti$), tetrakis(ethylmethylamino)titanium (IV) ($Ti[N(C_2H_5)(CH_3)]_4$), titanium(IV)(diisopropoxide-bis (2,2,6,6-tetramethyl-3,5-heptane dionate ($Ti[OCC(CH_3)_3CHCOC(CH_3)_3]_2(OC_3H_7)_2$), titanium tetrachloride ($TiCl_4$), titanium(IV) isopropoxide ($Ti[OCH(CH_3)_2]_4$), and titanium(IV) ethoxide ($Ti[O(C_2H_5)]_4$).

Examples of the precursor containing Si include N-sec-butyl(trimethylsilyl)amine ($C_7H_{19}NSi$), 1,3-diethyl-1,1,3,3-tetramethyldisilazane ($C_8H_{23}NSi_2$), 2,4,6,8,10-pentamethylcyclopentasiloxane ($(CH_3SiHO)_5$), pentamethyldisilane ($(CH_3)_3SiSi(CH_3)_2H$), tris(isopropoxy)silanol ($[(H_3C)_2CHO]_3SiOH$), chloropentamethyldisilane ($(CH_3)_3SiSi(CH_3)_2Cl$), dichlorosilane ($SiH_2Cl_2$), tridimethylaminosilane ($Si[N(CH_3)_2]_4$), tetraethylsilane ($Si(C_2H_5)_4$), tetramethylsilane ($Si(CH_3)_4$), tetraethoxysilane ($Si(OC_2H_5)_4$), dodecamethylcyclohexasilane ($(Si(CH_3)_2)_6$), silicon tetrachloride ($SiCl_4$), and silicon tetrabromide ($SiBr_4$).

Examples of the precursor containing Ta include (t-butylimide) tris(ethylmethylamino)tantalum(V) ($C_{13}H_{33}N_4Ta$, TBTEMT), tantalum(V) pentaethoxide ($Ta(OC_2H_5)_5$), (t-butylimide) tris(diethylamino)tantalum(V) ($(CH_3)_3CNTa(N(C_2H_5)_2)_3$), and pentakis(dimethylamino)tantalum(V) ($Ta(N(CH_3)_2)_5$).

Examples of the precursor containing Nb include niobium (V)ethoxide ($Nb(OCH_2CH_3)_5$) and tri s(diethylamide)(t-butylimide)niobium(V) ($C_{16}H_{39}N_4Nb$).

Examples of the precursor containing Hf include hafnium tetrachloride ($HfCl_4$), tetrakis dimethylamino hafnium (Hf $[N(CH_3)_2]_4$), tetrakis ethylmethylamino hafnium ($Hf[N(C_2H_5)(CH_3)]_4$), tetrakis diethylamino hafnium ($Hf[N(C_2H_5)_2]_4$), and hafnium-t-butoxide ($Hf[OC(CH_3)_3]_4$).

Examples of the precursor containing Zr include bis(methyl-$\eta^5$-cyclopentadienyl)methoxymethylzirconium (Zr $(CH_3C_5H_4)_2CH_3OCH_3$), tetrakis(dimethylamide)zirconium (IV) ($[(CH_3)_2N]_4Zr$), tetrakis(ethylmethylamide)zirconium (IV) ($Zr(NCH_3C_2H_5)_4$), and zirconium(IV)t-butoxide (Zr $[OC(CH_3)_3]_4$).

Using the ALD method, the coating film including the first layer and/or the second layer can be formed to a depth more than or equal to 10% of the thickness of the metal porous part in the thickness direction of the metal porous part.

When the first layer is formed by the ALD method, the second layer may be formed by an anodizing treatment of the cathode foil. Details of the anodizing treatment will be described later.

Step (iii)

The step (iii) of causing at least one of phosphorus or nitrogen to adhere to the surface of the metal porous part is performed, for example, by impregnating the metal porous part with a solution containing at least one of phosphorus or nitrogen. Thereafter, a heat treatment is performed so that phosphorus and/or nitrogen adhering to the inner walls of the pores diffuse into the metal porous part, and a layer (the third layer) containing at least one of phosphorus or nitrogen can be formed on the surface of the metal porous part. The third layer can enhance water resistance of the electrolytic capacitor.

The impregnation with the solution containing at least one of phosphorus or nitrogen may be performed in a step of anodizing the cathode foil. If an anodizing solution contains phosphorus or nitrogen, the inside of the pore can be impregnated with a solution containing a phosphorus compound or a nitrogen compound in parallel with the growth of the oxide film on the inner wall of the pore. In this case, phosphorus and/or nitrogen diffuses into the oxide film as the oxide film grows on the inner wall of the pore, so that the oxide film containing phosphorus and/or nitrogen grows.

The third layer may be formed by impregnating the cathode foil that has undergone the anodization with a solution containing at least one of phosphorus or nitrogen. By the subsequent heat treatment, phosphorus and/or nitrogen adhering to the inner walls of the pores diffuse into the anodization oxide film, and a third layer containing phosphorus and/or nitrogen grows at least on a surface layer of the oxide film The cathode foil that has undergone the anodization may be subjected to anodizing again using an anodizing solution containing at least one of phosphorus or nitrogen. In this case, a voltage applied to the cathode during the anodization performed again may be higher or lower than a voltage applied in the previous anodizing treatment. When the anodization is performed again at a voltage lower than the voltage applied in the previous anodizing treatment, the oxide film does not further grow, but the diffusion of phosphorus and/or nitrogen into the oxide film is promoted. Accordingly, the third layer can be formed to be thick. Further, a content of phosphorus and/or nitrogen in the third layer can be increased.

The anodizing treatment can be performed, for example, by applying a positive voltage to the metal foil in a state in which the cathode foil is immersed in the anodizing solution. At this time, the anodizing treatment may be performed under a temperature condition ranging from 50° C. to 85° C., inclusive, for example, if necessary.

Examples of the anodizing solution include an aqueous solution containing phosphoric acid, adipic acid, boric acid, oxalic acid, sulfuric acid, and/or salts thereof. Among these, a phosphate contains phosphorus, the third layer containing phosphorus can be grown by the anodizing treatment. Examples of the phosphate include an ammonium phosphate salt, a potassium phosphate salt, and a sodium phosphate salt.

Examples of the anodizing solution containing nitrogen include an aqueous solution containing an ammonium salt. The ammonium salt may be a primary ammonium salt, a secondary ammonium salt, a tertiary ammonium salt, or a quaternary ammonium salt in which one or more hydrogen atoms of an ammonium cation are substituted with an organic functional group. Among them, the ammonium phosphate salt contains both phosphorus and nitrogen, and thus, is preferable since the third layer containing phosphorus and nitrogen can be easily formed. Examples of the ammonium phosphate salt include diammonium monohydrogen phosphate and monoammonium dihydrogen phosphate.

The anodizing solution may contain one kind or two or more kinds of salts containing phosphorus and/or nitrogen. The anodizing solution may contain an adipate, a borate, or the like, or a salt containing neither phosphorus nor nitrogen, such as a potassium salt or a sodium salt. It is preferable to use an ammonium phosphate aqueous solution such as a monoammonium dihydrogen phosphate aqueous solution, or an ammonium adipate aqueous solution, from a viewpoint of operability.

The formation of the third layer (the impregnation with the solution containing phosphorus and/or nitrogen) may be performed before the formation of the first layer (and/or the second layer) by the ALD method, or may be performed after the formation of the first layer (and/or the second layer) by the ALD method. In the former case, the third layer is formed over the entire depth of the metal porous part, and the third layer can be interposed between the first layer and the second layer, and the metal porous part. On the other hand, in the latter case, it is difficult for phosphorus or nitrogen to diffuse into the metal porous part from the outer surface of the metal porous part where the first layer is already formed. For this reason, the third layer can be formed exclusively in the deep portion at the side close to the metal core part in the metal porous part where the first layer is not formed. In either case, the third layer can adhere to the region exceeding the depth of 10% of the thickness of the metal porous part in the thickness direction of the metal porous part.

The cathode foil that has undergone the anodizing treatment may be washed or dried as necessary.

A content of the phosphorus compound (for example, $PO_4^{3-}$) adhering to the cathode foil can be analyzed by ion chromatography. The content of the phosphorus compound adhering to the cathode foil ranges, for example, from 3 mg/m$^2$ to 300 mg/m$^2$, inclusive, and preferably from 5 mg/m$^2$ to 100 mg/m$^2$, inclusive.

In general, a large metal foil is subjected to a roughening treatment or an anodizing treatment from the viewpoint of mass productivity. In such a case, the treated metal foil is cut into a desired size to prepare the cathode foil.

Step (iv)

In step (iv) of preparing the anode body including the dielectric layer on the surface of the anode body, a metal foil containing a valve metal, which is a raw material of the anode body, is prepared, and a surface of the metal foil is roughened. By the roughening, a plurality of irregularities are formed on the surface of the metal foil. It is preferable that the roughening be performed by etching the metal foil. The etching may be performed by, for example, a direct current electrolysis method or an alternating current electrolysis method.

Next, the dielectric layer is formed on the roughened surface of the metal foil. A method for forming the dielectric layer is not particularly limited, and the dielectric layer can be formed by subjecting the metal foil to an anodizing treatment. Through the anodizing treatment of the metal foil, the surface of the metal foil is oxidized to form the dielectric layer that is an oxide film.

The anodizing treatment can be performed using, for example, an anodizing solution. The anodizing treatment can be performed by immersing the metal foil in the anodizing solution and performing a heat treatment. The temperature at this time is, for example, 50° C. to 80° C. inclusive. Alternatively, the anodizing treatment may be performed by immersing the metal foil in the anodizing solution and applying a voltage. Both the heat treatment and the voltage application may be performed for the anodizing treatment. The anodizing solution can be appropriately determined from those described for the anodizing of the cathode body. The anode body that has undergone the anodizing treatment may be washed or dried as necessary.

In general, a large metal foil is subjected to a roughening treatment and an anodizing treatment from the viewpoint of mass productivity. In such a case, the treated metal foil is cut into a desired size to prepare the anode body. The anode body after cutting has the dielectric layer on a main surface.

Step (v)

Subsequently, the capacitor element is formed using the anode body and the cathode foil for electrolytic capacitors (step (v)).

First, a wound body is produced using the cathode foil obtained in steps (i) to (iii) and the anode body prepared in step (iv). Anode body 21 and cathode foil are wound with separator 23 interposed therebetween. At this time, lead tabs 15A, 15B can be erected from the wound body as illustrated in FIG. 6 by performing the winding while rolling up lead tabs 15A, 15B.

Materials of lead tabs 15A, 15B are not particularly limited, and may be conductive materials. Materials of lead wires 14A, 14B respectively connected to lead tabs 15A, 15B are also not particularly limited, and may be conductive materials.

Next, among anode body 21, the cathode foil, and separator 23 that are wounded, winding stop tape 24 is disposed on the outer surface of the cathode foil located in the outermost layer, and an end of cathode foil is fixed with winding stop tape 24.

The third layer may be formed on the cathode foil that has formed the wound body. In this case, for example, the wound body is impregnated with a solution containing at least one of phosphorus or nitrogen to cause the at least one of phosphorus or nitrogen to adhere to the surface of the metal porous part of the cathode foil. Thereafter, a heat treatment is performed so that phosphorus and/or nitrogen adhering to the inner walls of the pores diffuse into the metal porous part, and the third layer can be formed on the surface of the metal porous part. When the anodizing treatment is performed, the anodizing treatment may be performed by, for example, subjecting the wound body in the state of being immersed in the anodizing solution to the heat treatment. Alternatively, the anodizing treatment may be performed by applying a positive voltage to the anode body of the wound body with a third electrode set as an opposite electrode in a state in which the wound body and the third electrode are immersed in the anodizing solution. Both the heat treatment and the voltage application may be performed. Temperature conditions of the anodizing solution and the anodizing treatment can be determined respectively from those described for the step (iii) as appropriate. The anodizing treatment may be performed in a state in which the whole of the wound body is immersed in the anodizing solution or a state in which at least a top surface or a bottom surface of the wound body is immersed in the anodizing solution. The wound body that has undergone the anodizing treatment is washed or dried as necessary.

When the wound body is subjected to the third layer formation treatment, phosphorus and/or nitrogen can also adhere to a surface of the first layer or the second layer. Accordingly, a crack that may be present on the surface of the first layer or the second layer can be coated with a layer containing phosphorus and/or nitrogen.

If the crack is generated in the first layer or the second layer, the liquid component enters the metal core part through the crack, and the cathode foil is easily degraded. As a result, ESR sometimes increases. However, the inner walls of the pores in the deep portion of the metal porous part can be covered with the third layer, and the crack generated in the first layer or the second layer can be covered with the third layer since the third layer containing phosphorus and/or nitrogen is formed after the formation of the first layer or the second layer. Accordingly, the increase in ESR due to the degradation of the foil can be suppressed, the ESR can be maintained low. In this case, the third layer can be formed to fill the crack that may be present in the first layer and/or the second layer.

In particular, in a case where the anode body and the cathode foil are laminated with the separator interposed therebetween to form the wound body in the production of the electrolytic capacitor, the crack is easily generated in the first layer after the formation of the wound body. Since the treatment for forming the third layer is performed after the formation of the wound body, the crack generated in the first layer is filled with the third layer, and it is possible to suppress the degradation of the cathode foil and the increase in ESR.

In the case of an electrolytic capacitor including a solid electrolyte such as a conductive polymer in an electrolyte, a step of attaching the conductive polymer to the wound body can be performed. The conductive polymer is attached so as to cover at least a part of the dielectric layer of anode body 21. The conductive polymer may adhere in a layer form to the surface of the dielectric layer of anode body 21 to form a conductive polymer layer (or a solid electrolyte layer) between anode body 21 and cathode body (cathode foil) 22, but the present disclosure is not limited to this case. The conductive polymer may also cover at least part of a surface of separator 23. The conductive polymer may be formed so as to fill the inside of the pore of the cathode body. As the conductive polymer, those described above can be used.

The conductive polymer may be attached to the wound body by a method for applying a solution containing, for example, a monomer, a dopant, and an oxidant to the capacitor element to cause chemical polymerization or electropolymerization on the capacitor element. The conductive polymer may also be attached to the wound body by a method for applying a treatment solution containing the conductive polymer (hereinafter, also simply referred to as a polymer dispersion) to the wound body. The polymer dispersion can be quickly impregnated by forming an oxide film on the main surface of the cathode body or forming the dielectric layer on the anode body.

A concentration of the conductive polymer contained in the polymer dispersion preferably ranges from 0.5% by mass to 10% by mass, inclusive. Further, an average particle diameter D50 of the conductive polymer preferably ranges, for example, from 0.01 μm to 0.5 μm, inclusive. Here, the average particle diameter D50 is a median diameter in a volume particle size distribution obtained by a particle size distribution measuring apparatus using dynamic light scattering.

The polymer dispersion contains a liquid dispersion medium and a conductive polymer dispersed in the liquid dispersion medium. The polymer dispersion may be a solution obtained by dissolving the conductive polymer in the liquid dispersion medium, or a dispersion liquid obtained by dispersing particles of the conductive polymer in the liquid dispersion medium. The wound body that has been impregnated with the treatment solution is normally dried to vaporize at least part of the liquid dispersion medium.

In order to suppress the dedoping in the conductive polymer, an acid may be dissolved in the liquid dispersion medium. Preferable examples of the acid include phosphoric acid, sulfuric acid, phthalic acid, benzoic acid, nitrobenzoic acid, salicylic acid, trimellitic acid, and pyromellitic acid.

The polymer dispersion can be obtained by, for example, a method for dispersing the conductive polymer in the liquid dispersion medium or a method for polymerizing a precursor monomer in the liquid dispersion medium and generating particles of the conductive polymer. Examples of the preferred polymer dispersion preferably include poly(3,4-ethylenedioxythiophene) (PEDOT) doped with polystyrene sulfonic acid (PSS), that is, PEDOT/PSS. Although an antioxidant for the conductive polymer may be added, it is unnecessary to use an antioxidant because PEDOT/PSS little oxidizes.

The liquid dispersion medium may be water, a mixture of water and a nonaqueous solvent, or a nonaqueous solvent. The nonaqueous solvent is not particularly limited, but for example, a protic solvent or an aprotic solvent can be used. Examples of the protic solvent include: alcohols such as methanol, ethanol, propanol, butanol, ethylene glycol, and propylene glycol; ethers such as formaldehyde and 1,4-dioxane; and the like. Examples of the aprotic solvent include: amides such as N-methylacetamide, N,N-dimethylformamide, and N-methyl-2-pyrrolidone; esters such as methyl acetate; ketones such as methyl ethyl ketone; and the like.

As a method for applying the polymer dispersion to the wound body (impregnating the wound body with the polymer dispersion), for example, a method for immersing the wound body in the polymer dispersion housed in a container is simple and preferable. Further, ultrasonic vibration may be applied to the wound body or the polymer dispersion while the wound body is immersed in the polymer dispersion. The drying of the wound body that has been picked up from the polymer dispersion is preferably performed at, for example, 50° C. to 300° C. inclusive. The step of applying the polymer dispersion to the wound body and the step of drying the wound body may be repeated two or more times. Conducting these steps a plurality of times can increase coverage of the conductive polymer on the wound body.

As described above, capacitor element 10 is obtained in which the conductive polymer is attached so as to cover at least a part of the dielectric layer. Note that the conductive polymer formed on the surface of the dielectric layer practically functions as a cathode material.

Subsequently, capacitor element 10 is further impregnated with a liquid component (electrolytic solution), thereby obtaining the electrolytic capacitor having an excellent restoration function of the dielectric layer.

A method for impregnating capacitor element 10 with the liquid component is not particularly limited. For example, a method for immersing capacitor element 10 in the liquid component housed in a container is simple and preferable. The impregnation is preferably performed under reduced pressure, for example, in an atmosphere of 10 kPa to 100 kPa inclusive. Examples of the liquid component include the above-described materials.

Next, capacitor element 10 is sealed. Specifically, capacitor element 10 is first housed in bottomed case 11 such that lead wires 14A, 14B are located on an open upper surface of bottomed case 11. As a material of bottomed case 11, metal such as aluminum, stainless steel, copper, iron, or brass, or an alloy thereof can be used.

Next, sealing member 12 formed so as to allow penetration of lead wires 14A, 14B is disposed above capacitor element 10, and capacitor element 10 is sealed in bottomed case 11. Next, the vicinity of the opening end of bottomed case 11 is drawn horizontally, and the opening end is curled to be caulked to sealing member 12. Then, seat plate 13 is disposed on this curled part to complete the electrolytic capacitor illustrated in FIG. 5. Thereafter, an aging treatment may be performed while a rated voltage is being applied.

Sealing member 12 is made of an elastic material containing a rubber component. As the rubber component, it is possible to use a butyl rubber (IIR), a nitrile rubber (NBR), an ethylene propylene rubber, an ethylene propylene diene rubber (EPDM), a chloroprene rubber (CR), an isoprene rubber (IR), a Hypalon rubber, a silicone rubber, a fluorine-containing rubber, and the like. Sealing member 12 may contain a filler such as carbon black or silica.

After capacitor element 10 is sealed, an anodizing treatment may be further performed to form the dielectric layer on the anode body or form the oxide film on the cathode body if necessary. The anodizing treatment at this time can be performed with an electrolytic solution. The anodizing treatment can be performed by, for example, applying a positive voltage to the anode body or the cathode body in a state in which capacitor element 10 is immersed in the electrolytic solution. At this time, a heating treatment is generally performed together. The temperature in the heating treatment is, for example, 80° C. to 150° C. inclusive.

The present disclosure can be used for an electrolytic capacitor.

What is claimed is:

1. An electrolytic capacitor, comprising:
   a cathode foil;
   an anode body including a dielectric layer disposed between a surface of the anode body and the cathode foil; and
   an electrolyte disposed between the cathode foil and the dielectric layer, wherein:
   the cathode foil includes:
     a metal porous part;
     a metal core part that is continuous with the metal porous part; and
     a coating film covering the metal porous part,
   a pore in the metal porous part is open at a first main surface of the cathode foil,
   the coating film is disposed in a region from the first main surface to a depth more than or equal to 10% of a thickness of the metal porous part in a thickness direction of the metal porous part,
   the coating film includes a first layer that is conductive and a second layer that is an oxide film, the first layer being disposed to cover at least a part of the second layer,
   the first layer is constituted by at least one conductive material selected from the group consisting of an amorphous carbon, a metal, and a compound of the metal, and
   a thickness of the first layer in a region of the metal porous part that is close to the first main surface is greater than a thickness of the first layer in a region of the metal porous part that is close to the metal core part.

2. The electrolytic capacitor according to claim 1, wherein the metal is at least one selected from the group consisting of nickel, titanium, silver, and gold.

3. The electrolytic capacitor according to claim 1, wherein the second layer includes at least one element selected from the group consisting of aluminum, titanium, silicon, tantalum, niobium, hafnium, and zirconium.

4. The electrolytic capacitor according to claim 3, wherein a thickness of the second layer is less than or equal to a thickness of an oxide film obtained by anodizing a metal containing the at least one element at 4 V.

5. The electrolytic capacitor according to claim 3, wherein a thickness of the second layer is more than a thickness of an oxide film obtained by anodizing a metal containing the at least one element at 4 V.

6. The electrolytic capacitor according to claim 1, further comprising a third layer that contains at least one of phosphorus or nitrogen, the third layer adhering to a region exceeding a depth of 10% of the thickness of the metal porous part from the first main surface in the thickness direction of the metal porous part.

7. The electrolytic capacitor according to claim 1, wherein a thickness of the coating film in a region of the metal porous part that is close to the first main surface is greater than a thickness of the coating film in a region of the metal porous part that is close to the metal core part.

8. The electrolytic capacitor according to claim 1, wherein at least a part of the coating film adheres to an inside of the metal porous part which is not to be exposed from the first main surface.

9. An electrolytic capacitor, comprising:
   a cathode foil;
   an anode body including a dielectric layer disposed between a surface of the anode body and the cathode foil; and
   an electrolyte disposed between the cathode foil and the dielectric layer, wherein:
   the cathode foil includes:
     a metal porous part;
     a metal core part that is continuous with the metal porous part; and
     a coating film covering the metal porous part,
   a pore in the metal porous part is open at a first main surface of the cathode foil,
   the coating film is disposed in a region from the first main surface to a depth more than or equal to 10% of a thickness of the metal porous part in a thickness direction of the metal porous part, the coating film includes a first layer that is conductive and a second layer that is an oxide film, the first layer being disposed to cover at least a part of the second layer, the first layer is constituted by at least one conductive material selected from the group consisting of an amorphous carbon, a metal, and a compound of the metal, and the electrolytic capacitor further comprises a third layer that contains at least one of phosphorus or nitrogen, the third layer adhering to a region exceeding a depth of 10% of the thickness of the metal porous part from the first main surface in the thickness direction of the metal porous part.

10. The electrolytic capacitor according to claim 9, wherein the metal is at least one selected from the group consisting of nickel, titanium, silver, and gold.

11. The electrolytic capacitor according to claim 9, wherein the second layer includes at least one element selected from the group consisting of aluminum, titanium, silicon, tantalum, niobium, hafnium, and zirconium.

12. The electrolytic capacitor according to claim 11, wherein a thickness of the second layer is less than or equal to a thickness of an oxide film obtained by anodizing a metal containing the at least one element at 4 V.

13. The electrolytic capacitor according to claim 11, wherein a thickness of the second layer is more than a thickness of an oxide film obtained by anodizing a metal containing the at least one element at 4 V.

14. The electrolytic capacitor according to claim 9, further comprising a third layer that contains at least one of phosphorus or nitrogen, the third layer adhering to a region exceeding a depth of 10% of the thickness of the metal porous part from the first main surface in the thickness direction of the metal porous part.

15. The electrolytic capacitor according to claim 9, wherein a thickness of the coating film in a region of the metal porous part that is close to the first main surface is greater than a thickness of the coating film in a region of the metal porous part that is close to the metal core part.

16. The electrolytic capacitor according to claim 9, wherein at least a part of the coating film adheres to an inside of the metal porous part which is not to be exposed from the first main surface.

* * * * *